(12) United States Patent
Jung et al.

(10) Patent No.: US 7,088,891 B2
(45) Date of Patent: Aug. 8, 2006

(54) OPTICAL POWER SPLITTER

(75) Inventors: Sun-Tae Jung, Anyang-shi (KR); Oh-Dal Kwon, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 138 days.

(21) Appl. No.: 10/391,671

(22) Filed: Mar. 19, 2003

(65) Prior Publication Data
US 2004/0008946 A1    Jan. 15, 2004

(30) Foreign Application Priority Data
Jul. 9, 2002    (KR) ............................... 2002-39742

(51) Int. Cl.
*G02B 6/26* (2006.01)
(52) U.S. Cl. .................. 385/45; 385/15; 385/39
(58) Field of Classification Search .................. 385/45, 385/49, 50, 52, 39
See application file for complete search history.

(56) References Cited

U.S. PATENT DOCUMENTS

| | | | | |
|---|---|---|---|---|
| 4,953,935 | A | * | 9/1990 | Suchoski et al. ............. 385/46 |
| 5,179,604 | A | * | 1/1993 | Yanagawa et al. ............. 385/24 |
| 5,729,642 | A | | 3/1998 | Thaniyavarn ................ 385/17 |
| 5,970,192 | A | * | 10/1999 | Osugi et al. .................. 385/49 |
| 6,175,675 | B1 | | 1/2001 | Lee et al. ..................... 385/50 |
| 2001/0041034 | A1 | | 11/2001 | Sasaki et al. | |

FOREIGN PATENT DOCUMENTS

| | | |
|---|---|---|
| GB | 2351360 A | 12/2000 |
| JP | 05-005811 | 1/1993 |
| JP | 08-313744 | 11/1996 |
| JP | 10-227934 | 8/1998 |
| JP | 2002-040284 | 2/2002 |

OTHER PUBLICATIONS

N. Momotsu et al.; "Compact and Economical High-Density PLC-Type Splitters;" 5th Asia Pacific Conference on Communications, vol. 2; Oct. 18, 1999; XP 002300028; 2 pgs.

* cited by examiner

*Primary Examiner*—Jennifer Doan
(74) *Attorney, Agent, or Firm*—Cha & Reiter, L.L.C.

(57) ABSTRACT

An optical power splitter that can minimize the chip size with its manufacturing cost. The optical power splitter has one input optical waveguide and N output optical waveguides and splits an optical signal incident from the input optical waveguide into N optical signals. The optical power splitter includes at least two optical splitters having a structure of a planar lightwave circuit element and arranged apart from one another at predetermined intervals in a single chip, and an alignment waveguide for aligning the input and output optical waveguides of the plurality of optical splitters.

8 Claims, 3 Drawing Sheets

OPTICAL POWER SPLITTER

CLAIM OF PRIORITY

This application claims priority to an application entitled "OPTICAL POWER SPLITTER" filed in the Korean Intellectual Property Office on Jul. 9, 2002 and assigned Serial No. 2002-39742, the contents of which are hereby incorporated by reference.

BACKGROUND OF THE INVENTION

1. Field of the Invention

The present invention relates to an optical communication element, and more particularly to an optical power splitter of a planar lightwave circuit (PLC) type.

2. Description of the Related Art

In general, an optical power splitter is used for channeling input light into several different paths and has a wide application in an optical communication system, an optical access network, etc. The optical power splitter is classified into 1×2, 1×4, 1×8, ... 1×N (where N is a natural number) types according to the number of its output terminals.

There are two representative methods used to manufacture an optical power splitter: a method of fusing an optical fiber in a melting-drawing manner and a PLC type method. Generally, the melting-drawing method is used in the systems having low channels, such as 1×2, 1×4, etc., whereas the PLC method is used in the systems with over 8 channels.

Although the PLC method considered a better choice over the melting-drawing method, it is not widely used due to its limitation in the number of channels and its high manufacturing cost. Even when the number of channels are reduced, the manufacturing cost will not be reduced. For example, the cost required for manufacturing an optical power splitter with four optical splitters of a 1×2 PLC type is twice or three times the cost of manufacturing an optical power splitter with one only optical splitter of a 1×8 PLC type. In addition, the manufacturing cost of the 1×2 PLC type per channel is twice or three times that of the 1×8 PLC type.

FIG. 1 illustrates the basic structure of the conventional optical power splitter with four 1×2 (i.e., 4(1×2)) optical splitters. As shown in FIG. 1, the conventional optical power splitter has a dicing line for cutting the splitter into individual elements. Thus, the conventional optical power splitter requires a space for accepting four divided modules which has an adverse effect in the in chip size. In addition, in the conventional optical power splitter, time for assembling the each optical splitter is mostly spent in housing the splitters, thus an efficient work time and material cost cannot be realized.

SUMMARY OF THE INVENTION

Accordingly, the present invention has been made to solve the above-mentioned problems occurring in the prior art, by providing a PLC type optical power splitter that can minimize the size of the chip and greatly reduce its manufacturing cost.

According to one aspect of the invention, there is provided an optical power splitter having one input optical waveguide and N output optical waveguides for splitting an optical signal incident from the input optical waveguide into N optical signals, the optical power splitter comprising: at least two optical splitters having a structure of a planar lightwave circuit element and arranged apart from one another at predetermined intervals in a single chip; and, an alignment waveguide for aligning the input and output optical waveguides of the plurality of optical splitters.

Preferably, the space between the optical waveguides of the arranged optical splitters is set to at least 127 μm.

Preferably, the space of the input optical waveguides of the arranged optical splitters is 250 μm and the space of the output optical waveguides is 127 μm.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, one preferred embodiment of the present invention will be described with reference to the accompanying drawings. For the purposes of clarity and simplicity, a detailed description of known functions and configurations incorporated herein will be omitted as it may make the subject matter of the present invention rather unclear.

Figure 1:
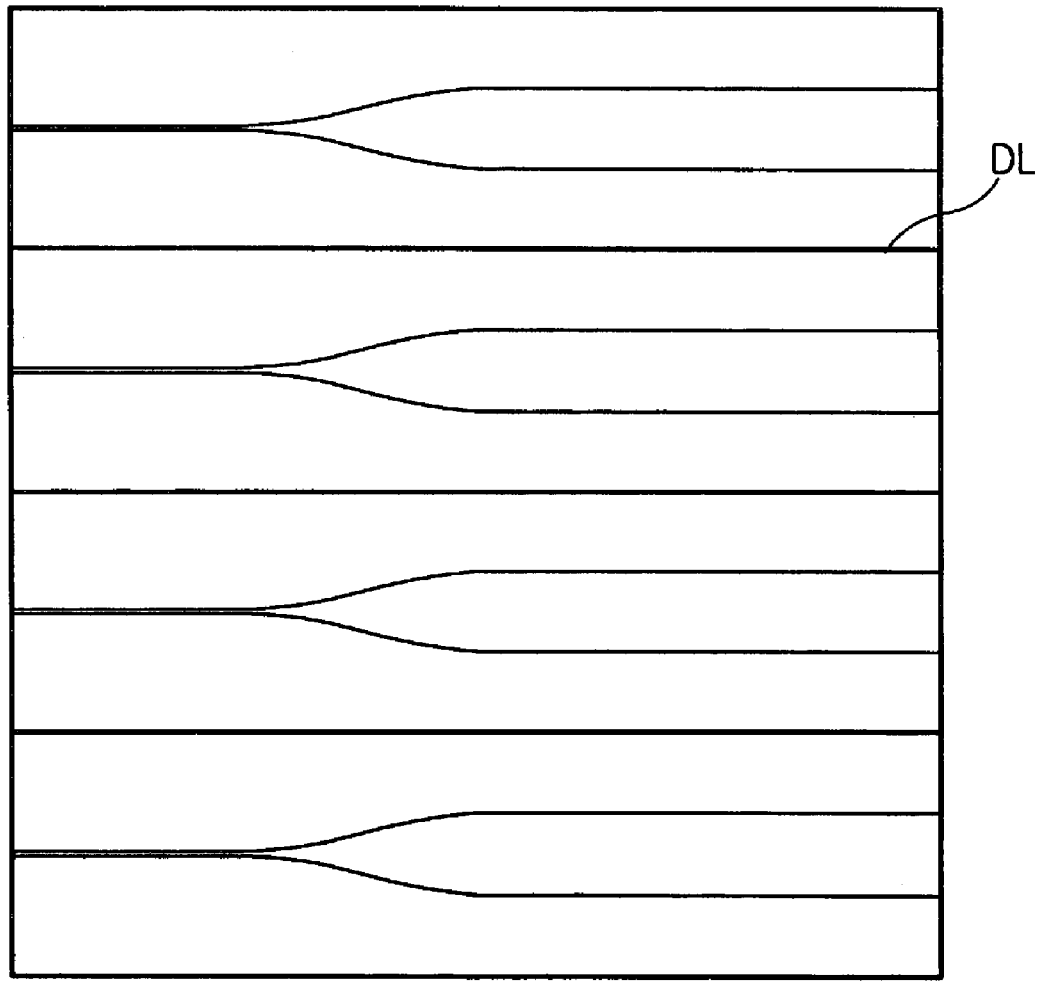
FIG. 1 shows a basic structure of the conventional optical power splitter having four optical splitters of a 1×2 PLC type.
Figure 2:
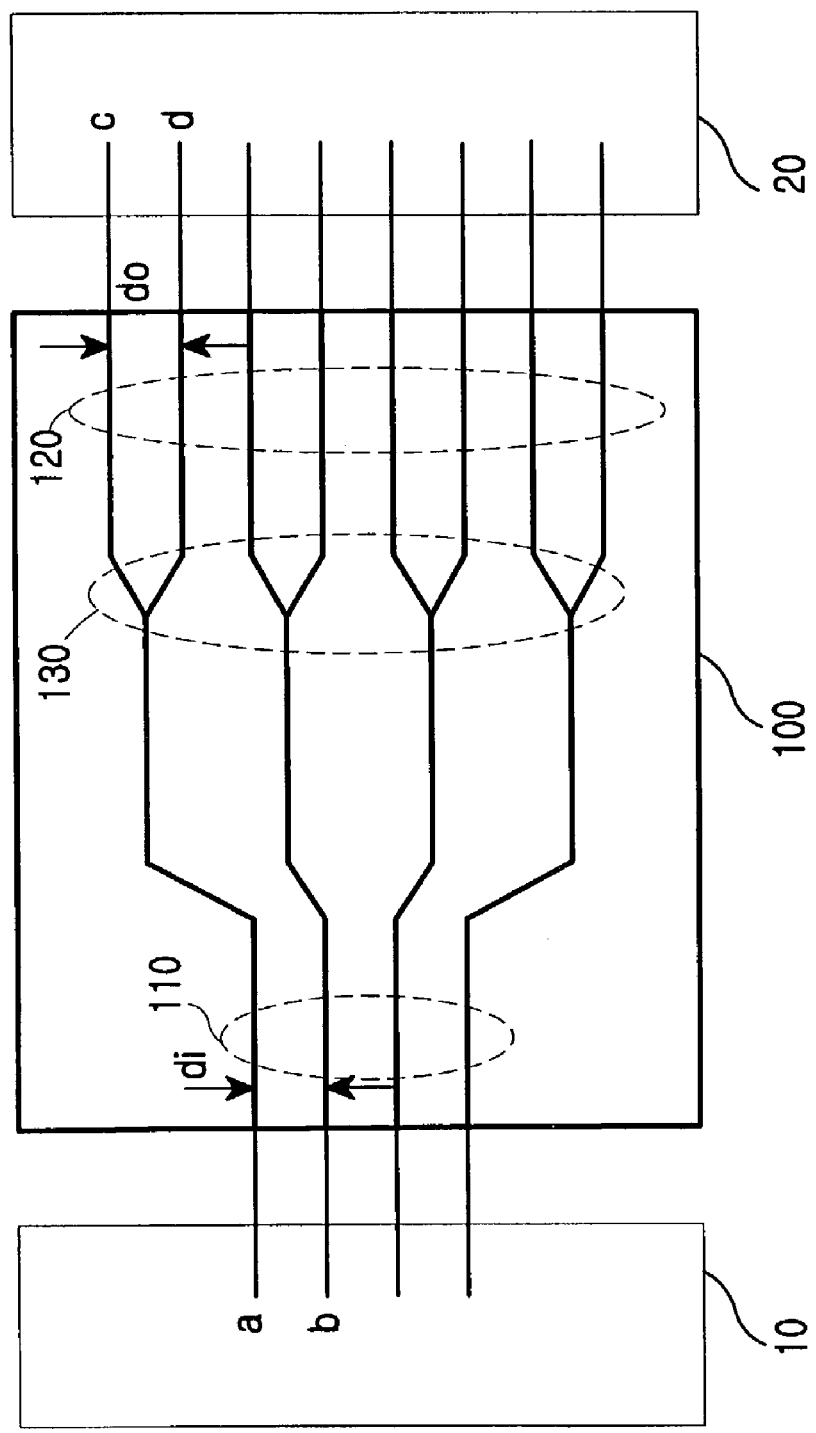
FIG. 2 shows a basic structure of an optical power splitter having four 1×2-type optical splitters according to an embodiment of the present invention.

FIG. 2 depicts the basic structure of an optical power splitter having four 1×2-type optical splitters according to an embodiment of the present invention.

As shown in FIG. 2, the PLC-type optical power splitter includes an input optical fiber array 10, a PLC chip 100, and an output optical fiber array 20. A space between optical fibers a and b of the input optical fiber array 10 is set to 250 μm, while a space between optical fibers c and d of the output optical fiber array 20 is set to 127 μm. These spaces comply with the industry standard, but the spaces may be varied in accordance with a user's demand.

In order to reduce the size of the element, it is logical to reduce the space between the optical fibers; however, it is difficult to manufacture optical fibers with a spacing below 127 μm between them. As such, the space of 127 μm is preferable in the present invention.

The PLC chip 100 is configured so that four Y-junction 1×2 splitters are integrated into a single chip in the form of one PLC. The space (di) between the optical fibers at the input terminals 110 of the chip and the space between the optical fibers at the output terminals 120 are same as the spaces (between a and b, and between c and d) at the input and output optical fiber arrays 10 and 120, respectively. The optical fibers arranged at the input terminals 110 of the chip at regular intervals are bent at an angle to accommodate proper spacing for the Y-junction portion 130 where the optical fibers are branched out to the output terminals of the output terminals 120.

Figure 3:
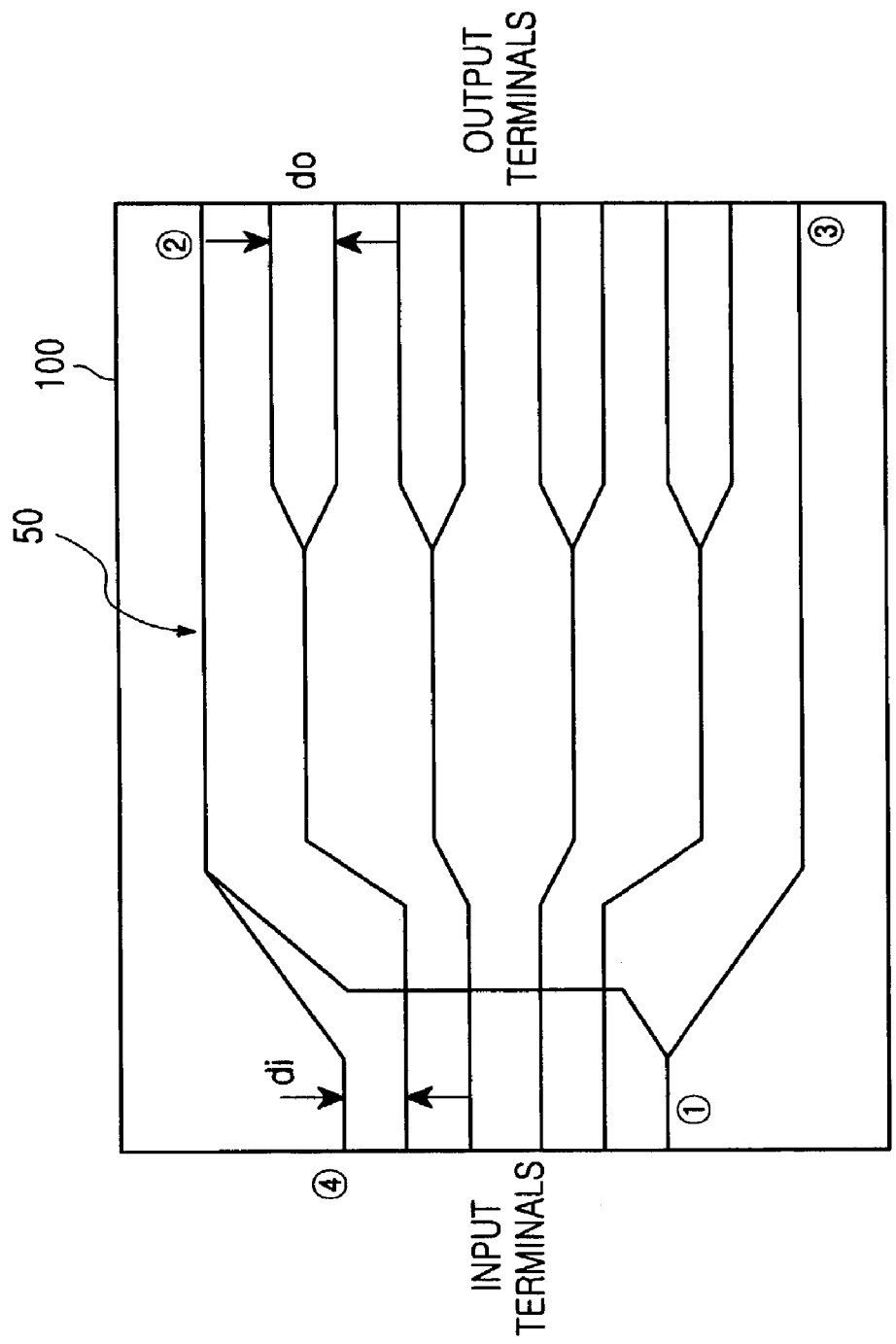
FIG. 3 illustrates the structure of a PLC chip part of four 1×2-type optical splitters according to an embodiment of the present invention.

Referring to FIG. 3, an alignment optical waveguide 50 consists of lines (1) through (4) is provided for arranging the input and output optical fiber arrays 10 and 20. According to the aligning method, if a ray of light is incident on the line (1), the light is divided and propagated into lines (2) and (3), so that the output terminals are aligned using these lines. After aligning the output terminals, if the light is incident on the line (2), the light is divided and propagated into lines (4) and (1), so that the input terminals are aligned using these lines.

Several advantageous effects may be obtained by integrating several 1×2-type optical splitters into a single chip as explained hereinafter in comparison to the conventional optical splitter.

First, in the conventional optical splitter having four 1×2-type optical splitters, and each splitter must include a dicing line, thus increasing its size. In contrast, according to the present invention, as four 1×2-type optical splitters are integrated into a single chip without requiring the dicing line, the size of the splitters can be greatly reduced.

Second, the conventional optical splitters require four separate aligning and bonding operations, and further an extra time for assembling each of all four optical splitters is required. Where as in the present invention, the aligning and bonding process needs only to be performed only once to manufacture a single element, and thus the manufacturing time can be reduced.

Third, during the housing stage, the conventional optical splitters require four cases for the separately housing each of the optical splitters and the corresponding optical fiber array with four one-cores and four two-cores. However, according to the present invention, one case and one optical fiber array with one four-core and one eight-core are only required, thereby reducing the material cost by ⅓.

While the invention has been shown and described with reference to one preferred embodiment thereof, it will be understood by those skilled in the art that various changes in form and details may be made therein without departing from the spirit and scope of the invention as defined by the appended claims. For example, the present invention can be applied to any other structure in which P (where, P is a positive number more than 2) 1×N-type (where, N is a positive number more than 2) or M×N-type (where, M is a positive number more than 1, and N is a positive number more than 2) splitters are integrated into a single chip, in addition to the structure in which four 1×2-type splitters are integrated. Therefore, the scope of the invention is not limited to the embodiment disclosed herein and is determined by the claims of the present and equivalents thereof.

What is claimed is:

1. An optical power splitter having one input optical waveguide and N output optical waveguides for splitting an input optical waveguide into N optical signals, comprising:
   at least two optical splitters having a structure of a planar lightwave circuit element and arranged apart from one another at a predetermined interval in a single chip;
   an input optical fiber array coupled to one end of the optical power splitter and an output optical fiber array at the other end;
   an alignment waveguide for aligning the input and output optical waveguides of the plurality of optical splitters wherein the alignment waveguide having first and second lines at one end and third and fourth lines at the other end for aligning the optical power splitter with said input optical fiber array and said output optical fiber array.

2. The optical power splitter as claimed in claim 1, wherein a space between the optical waveguides of the arranged optical splitters is set to at least 127 μm.

3. The optical power splitter as claimed in claim 1, wherein a space of the input optical waveguides of the arranged optical splitters is set at 250 μm, and a space of the output optical waveguides is set at 127 μm.

4. The optical power splitter as claimed in claim 1, wherein the N represents a natural number greater than 2.

5. The optical power splitter as claimed in claim 1, wherein the optical splitter comprises an 1×2-type optical splitter.

6. The optical power splitter as claimed in claim 1, wherein, if a ray of light is incident on the first line, the incident light is divided and propagated to the second and third lines.

7. The optical power splitter as claimed in claim 1, wherein, if a ray of light is incident on the second line (2), the incident light is divided and propagated to the first and fourth lines.

8. The optical power splitter as claimed in claim 1, wherein a space between the optical splitters at an input terminal of the optical power splitter is same as a space between the optical splitters at an output terminal of the optical power splitter.

* * * * *

UNITED STATES PATENT AND TRADEMARK OFFICE
CERTIFICATE OF CORRECTION

| | | |
|---|---|---|
| PATENT NO. | : 7,088,891 B2 | Page 1 of 1 |
| APPLICATION NO. | : 10/391671 | |
| DATED | : August 8, 2006 | |
| INVENTOR(S) | : Sung-Tae Jung and Oh-Dal Kwon | |

It is certified that error appears in the above-identified patent and that said Letters Patent is hereby corrected as shown below:

Column [4] Line 1-17 What is claimed is:, Claim 1, should read

1. An optical power splitter having one input optical waveguide and N output optical waveguides for splitting an input optical waveguide into N optical signals, comprising: at least two optical splitters having a structure of a planar lightwave circuit element and arranged apart from one another at a predetermined interval in a single chip;
an input optical fiber array coupled to one end of the optical power splitter and an output optical fiber array at the other end;
an alignment waveguide for aligning the input and output optical waveguides of the plurality of optical splitters wherein the alignment waveguide having first and [second] fourth lines at one end and third and [fourth] second lines at the other end for aligning the optical power splitter with said input optical fiber array and said output optical fiber array.

Signed and Sealed this

Thirteenth Day of May, 2008

JON W. DUDAS
*Director of the United States Patent and Trademark Office*